July 12, 1960 R. W. FRITTS 2,944,404
THERMOELECTRIC DEHUMIDIFYING APPARATUS
Filed April 29, 1957
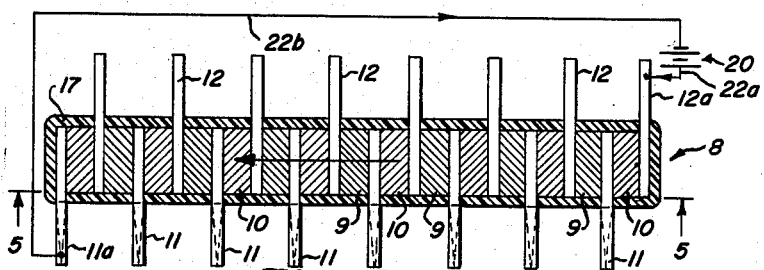
Fig. 7
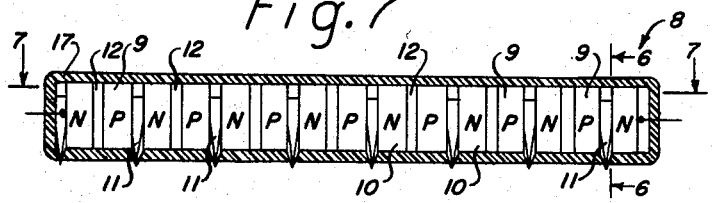
Fig. 5
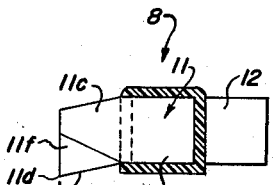
Fig. 6
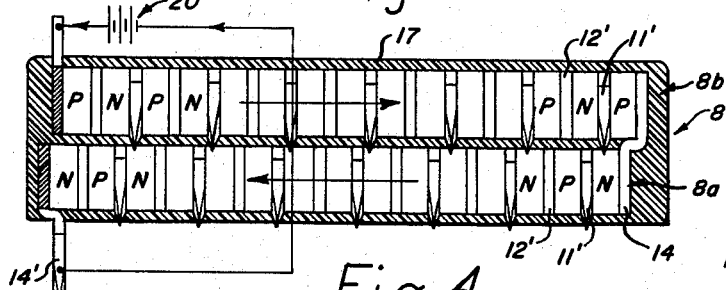
Fig. 4
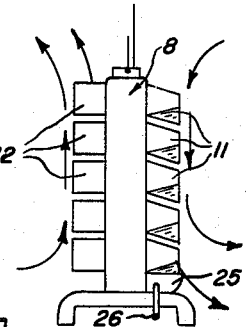
Fig. 3
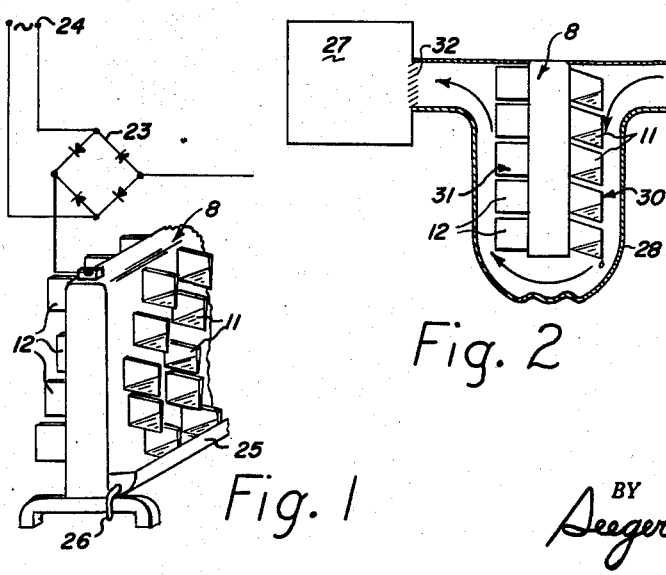
Fig. 2
Fig. 1
INVENTOR.
Robert W. Fritts
BY Seegert & Schwalbach
Att'ys

United States Patent Office 2,944,404
Patented July 12, 1960

2,944,404

THERMOELECTRIC DEHUMIDIFYING APPARATUS

Robert W. Fritts, Elm Grove, Wis., assignor, by mesne assignments, to Minnesota Mining and Manufacturing Company, a corporation of Delaware Filed Apr. 29, 1957, Ser. No. 655,858

11 Claims. (Cl. 62—3)

This invention relates to apparatus for condensing vapors and more particularly to apparatus for removing water vapor from air.

There has long existed a need for a simple, safe, efficient, quiet, inexpensive dehumidifying apparatus for condensing water vapor from ambient air. It is a general object of this invention to provide a Peltier type heat pump dehumidifying apparatus affording the aforementioned desired characteristics.

A more specific object of the invention is to provide apparatus of the aforementioned character which has no moving parts and thus is silent.

A further object of the invention is to provide apparatus as above characterized which is relatively open or exposed to the ambient air to thereby permit a large capacity of air flow across its dehumidifying surfaces per unit size.

Another object of the invention is to provide a specific arrangement of components in a Peltier type heat pump which afford a minimal $I^2R$ or Joule losses in the electrical circuitry thereof.

Another object of the invention is to provide a device as aforementioned which is compact in all dimensions, offers minimal resistance to air flow, is sturdy, easily fabricated, and otherwise well-adapted to the purposes for which it was designed.

The novel features that are characteristic of the invention are set forth with particularity in the appended claims. The invention itself, however, both as to its organization and method of operation, together with additional objects and advantages thereof, will best be understood by the following description of specific embodiments when read in connection with the accompanying drawings, in which:

Figure 1 is a fragmentary perspective view of dehumidifying apparatus constructed in accordance with the inventive concept, part of the circuitry thereof being shown semi-diagrammatically;

Figure 2 is an end view, partially in section, of a modified form of dehumidifying apparatus similar in many respects to the apparatus depicted in Figure 1;

Figure 3 is a left-hand end view of the apparatus shown in Figure 1;

Figure 4 is a fragmentary side elevational view of the bank of heat pump thermoelements and the thermojunction members illustrated in the dehumidifying apparatus shown in Figures 1 to 3, a portion of the thermoinsulation having been removed so as to show the relationship of the component parts of the two rows or layers of thermoelements and thermojunction members illustrated;

Figure 5 is a view similar to Figure 4 showing a single row or layer of thermoelements and thermojunction members;

Figure 6 is a transverse vertical sectional view taken along the line 6—6 of Figure 5; and Figure 7 is a sectional plan view taken along the line 7—7 of Figure 5.

Referring now to Figures 5 to 7 of the drawings, the reference numeral 8 represents electroresponsive dehumidifying means for ambient air in the form of a single bank Peltier type thermoelectric heat pump which is operable to condense moisture from ambient air on one side thereof and is operable to exhaust the heat absorbed from the ambient air on the other side thereof.

More particularly, the heat pump bank 8 may comprise a generally rectangular assembly of alternately situated dissimilar thermoelements 9 and 10 (to be later described) which are alternately interspersed with flat plate or strip-like thermojunction members 11 and 12. As shown, the thermojunction members 11 and 12 extend outwardly in opposite directions, and each are formed and assembled such that portions of each member are in direct electrical and thermal contact with the thermoelements 9 and 10. For ease of discussion, the members 11 may be characterized as cold or heat absorbing thermojunction members and thermojunction members 12 as hot or heat exhausting thermojunction members.

As best shown in Figures 5 and 6, the cold thermojunction members 11 are each formed with the first portion 11b the opposite sides of which are in direct contact with the alternate thermoelements 9 and 10, and a second or fin portion 11c which extends outwardly and downwardly from portion 11b. The lower edge 11e of portion 11c (as best shown in Figure 6) slopes downwardly from portion 11b to a point 11d, the latter forming a drip edge for moisture that tends to condense on portion 11c. If desired, the two side walls of portion 11c may be bevelled toward the outer-lowermost corner 11d, as at 11f to enhance the tendency of the condensed moisture to drip from point 11d rather than staying and frosting up on the remainder of portion 11c.

The hot or exhaust thermojunction members 12 are similar to thermojunction members 11 but without having the outwardly extending or fin portion offset in the manner of portion 11c. As shown in Figure 7, the thermojunction members 11 and 12 are preferably relatively flat or thin as compared to their length, and when in assembled relation are disposed such that a portion of the two large flat surfaces thereof are in contact with the alternate thermojunction members 9 and 10 as shown. Thus, the electrical path through the heat pump bank 8 as shown by the arrows in Figures 4 and 7, traverses the thickness, i.e., short or thin dimension of the thermojunction members 11 and 12, and thus $I^2R$ losses are at a minimum.

A layer of electrical and thermal insulation 17 is disposed in surrounding relation to the heat pump bank 8 and to the individual rows or layers thereof, affording both electrical and thermal insulation therefor. The fin portions of thermojunction members 11 and 12 protrude through the layer of insulation covering the side walls of bank 8 for coaction with the ambient air as shall be apparent.

The electrical circuitry for the apparatus comprises a direct current source, illustrated schematically at 20 in Figure 7. A conductor 22a is electrically connected to the extending fin portion of a hot thermojunction member 12a and a return conductor 22b is connected to a cold thermojunction member, for example, thermojunction member 11a at the opposite end of the bank 8, and is also connected to the other side of the source 20. Thus, the current flows, as shown by the arrows, from the source 20 through conductor 22a to hot or exhaust fin 12a, to thermoelement 10, then serially through thermojunction member 11, thermoelement 9, to the next thermojunction member 12, and so on through the alternate thermoelements of thermojunction members until it reaches the left-hand end of the heat pump bank (as shown in Figure 7), whereupon the current will return to the source 20 through conductor 22b.

As aforementioned, it is required that the thermoelements 9 and 10 be dissimilar. By this it is meant that they must be of opposite polarity, and depending upon the direction of current flow, so disposed that the junction between the thermoelements 10 and 11 pump heat from the cold or absorbing fins 11 to the exhaust fins 12. In a positive thermoelement heat flows in the direction of current flow and in a negative thermoelement the heat flows opposite to the current flow.

While any suitable dissimilar materials exhibiting the required positive and negative characteristics may be used, it is preferred that thermoelements 9 and 10 be of materials which exhibit a high Peltier coefficient, low thermal conductivity and low electrical resistivity. More specifically, thermoelements 9 and 10 may be of the materials described in the copending application of Robert W. Fritts and Sebastian Karrer, Serial No. 512,436, filed June 6, 1956. Such materials are semi-metallic alloys or compositions which may be characterized as binary metallic compounds of slightly imperfect composition, i.e., containing beneficial impurities constituting departures from perfect stoichiometry by reason of an excess of one of the metals over the other and/or containing beneficial impurity substances denominated as promoters. Such semi-metallic compositions also include mixtures of such binary metallic compounds, which may be denominated ternary metallic alloys or compositions. Certain of these alloys or compositions exhibit negative and certain exhibit positive electrical characteristics.

A negative thermoelement may, for example, be formed of an alloy comprising lead and at least one member of the group tellurium, selenium and sulphur. For example, a negative thermoelement of lead-selenium-tellurium composition could include a tellurium-selenium constituent in which the selenium is but a trace. In this case, such constituent should constitute from 35% to 38.05% by weight of the composition, the balance (61.95% to 65% by weight) being lead. At the other extreme where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

A negative thermoelement may also be formed of an alloy of lead, selenium and sulphur. For example, a thermoelement of lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.3% by weight) being lead. Between these two extremes, the selenium-sulphur constituent varies linearly with the ratio of selenium to sulphur (expressed in atomic percent) in the selenium-sulphur constituent. With regard to the aforementioned compositions, it will be observed that in each case there is an excess of lead over and above the amount thereof necessary for satisfying the stoichiometric proportions of the compound formed in the second constituent or constituents, i.e., the tellurium, selenium or sulphur. For example, a composition consisting substantially of lead and selenium can contain up to 10.4% lead by weight of the total composition over and above the 72.41% lead stoichiometrically necessary for combination with selenium.

The electrical characteristics of the aforementioned semi-metallic alloys, desirable, for example, in the thermoelements for heat pump application, can be markedly and advantageously altered in a reproducible manner by the addition thereto of controlled amounts of matter other than the constituents of the base composition. Such compositions may also be denominated "beneficial impurities" as distinguished from undesirable impurities. For convenience, these additions are hereinafter designated "promoters," since they tend to enhance the electrical characteristics desired for the particular application of the base compositions.

As has previously been observed, all of the aforementioned base compositions exhibit negative Peltier E.M.F. and negative conductivity. By the addition of certain "promoters," such negative properties may be enhanced, while the polarity of the electrical properties of the base compositions may be reversed by the addition of certain other "promoters" to provide a semi-metallic composition having positive electrical characteristics, i.e., positive conductivity and Peltier E.M.F.

The aforementioned copending application of Robert W. Fritts and Sebastian Karrer gives a complete description of the beneficial impurities, including both departures from perfect stoichiometry and promoters, which have been found to be effective for improvement of the electrical properties of semi-metallic thermoelements for heat pump applications when added to the aforementioned base compositions in minor amounts. For example, up to a maximum of 6.9% by weight of beneficial impurity including 3.9% excess lead and 3.0% promoter for promoted compounds and a maximum of 10.4% by weight of beneficial impurity for unpromoted compositions.

The proportions and ranges of the various constituents aforementioned and particularly the minimum limits of lead constituent in the compositions, must be regarded as critical if the composition is to have the electrical properties desired in thermoelectric heat pump elements. If the lead content is significantly less than the minimum amount indicated for any particular selenium-tellurium or selenium-sulphur proportion, the desirable values of Peltier E.M.F. and resistivity will not be afforded, and the significant electrical and mechanical properties will not be reproducible. On the other hand, if the lead content for any composition appreciably exceeds the aforementioned maximum limit, the resulting composition is too metallic in nature to afford satisfactory electrical characteristics for the purposes of the present invention.

A positive thermoelement may also be formed of an alloy of lead and tellurium in which there is an excess of tellurium over and above the amount thereof necessary for satisfying the stoichiometric proportions of the compound lead-telluride. Such alloy or composition should consist essentially of lead and tellurium in which the lead is present in the range of 58.0% to 61.8% by weight and the balance in the range of 42.0% to 38.2% by weight tellurium. It will be observed that in this case there is an excess of tellurium over and above the amount thereof necessary for satisfying the stoichiometric proportions.

As has been previously observed, the tellurium rich base lead-tellurium compositions exhibit positive Peltier E.M.F. and positive conductivity. The electrical characteristics of this compound, desirable, for example in thermoelements for heat pump applications, can be markedly and advantageously altered in a reproducible manner by addition thereto of controlled amounts of matter other than the constituents of such base composition. Such matter may also be denominated "beneficial impurities" as distinguished from undesirable impurities, and for convenience, such additions are also designated "promoters," since they tend to enhance the electrical characteristics desired for the particular application of the base composition.

The aforementioned copending application of Robert W. Fritts and Sebastian Karrer gives a complete description of the beneficial impurities, including both departures from perfect stoichiometry and promoters, which have been found to be effective for improvement of electrical properties of semi-metallic thermoelements for heat pump applications when added to the aforementioned tellurium rich base lead-tellurium compositions. For example, up to a maximum of 5.5% by weight of beneficial impurity including 4.9% excess tellurium and 0.6% promoter for promoted compounds and a maximum of 6.7% by weight of beneficial impurity for unpromoted compositions.

The proportions and ranges of the constituents of the tellurium rich compositions aforementioned and particularly the minimum limits of tellurium in the compositions, must be regarded as critical if the composition is to have the electrical properties desired in thermoelectric heat pump elements. If the tellurium content is significantly less than the minimum amount indicated, the desired values of Peltier E.M.F. and resistivity will not be afforded and the significant electrical and mechanical properties will not be reproducible. On the other hand, if the tellurium content appreciably exceeds the aforementioned maximum limits, the resulting compositions will not afford satisfactory electrical characteristics for the purposes of the present invention.

Not only are the proportions and ranges of the compositions aforedescribed considered to be critical, but so also is the purity. More specifically, the limit of tolerable metallic impurity in the final composition has been found to be on the order of 0.01%, and the composition must be substantially oxygen free, if the mechanical and electrical properties desired are to be maintained and are to be reproducible. In the case of promoted compositions, however, the limit of tolerable impurity is 0.001%.

For purposes of the present application it will be assumed as aforenoted that the current flow is in the direction of the arrows in the conductors 22b and 22a and that thermoelements 9 exhibit positive characteristics and thermoelements 10 exhibit negative characteristics. Thus, as a given current flows from the direct current source 20 through the alternate thermoelements and thermojunction members, heat is absorbed from the ambient air surrounding the extending fin portions of the cold thermojunction members 11 and is pumped to the fin portions of the hot thermojunction members 12 for exhaustion to the ambient air surrounding the latter. When the temperature of the ambient air surrounding the cold thermojunction members 11 reaches the dew point, the water vapor will tend to condense on the fin portions 11c and run down to dripping point 11d and thence fall to suitable collection means, for example, the collection means 25 shown in Figures 1 and 3.

Figure 4 shows in detail the arrangement of two adjacent rows or layers of thermoelement and thermojunction members in a bank 8 comprising a plurality of layers of the type shown in Figures 5 to 7. In Figure 4 it will be observed that the lower bank 8a is offset horizontally with respect to the upper bank 8b. As perhaps best shown in Figure 1, any number of suitable rows or layers may be incorporated in a bank 8, each layer or row preferably being offset from the one just above. The horizontal offsetting of one layer or row relative to another prevents possible electrical shorting of the thermojunction fins in one layer to the next. Further, the horizontal effect exposes more of the projecting or fin portions of the hot and cold thermojunction members to the ambient air flow and also prevents condensed water formed on the fins of an upper layer or row from dripping directly onto the fins therebelow.

In connecting the series electrical circuit of the layer or row 8b to the next succeeding lower layer 8a, a hot thermojunction member 14 is utilized which is similar to the other hot thermojunction members except that it has a depending offset portion which conducts the current from a positive element in bank 8b to a negative element in bank 8a so as to keep the correct heat pumping relationship therebetween. The depending offset portion is preferably provided with an external fin adjacent the row 8a corresponding to the fin thereof adjacent row 8b. A cold thermojunction member 14' is similarly suitably formed on the other end of bank 8a to conduct, if desired, the current to the next succeeding lower row or layer, and to also afford a heat dissipating fin adjacent the next lower layer.

The bank 8 shown in Figures 1, 2 and 3 illustrates the use of five layers or rows of thermoelements and thermojunction members in a bank as a continuation of the arrangement shown in Figure 4. The arrangement shown in Figures 1 and 3 is particularly well-adapted for dehumidifying ambient air in that it is a relatively open structure which does not obstruct the flow of ambient air and hence affords a large capacity of air flow thereacross. The heating of the hot side and cooling of the cold side of the banks shown in Figure 1 causes simultaneous opposite air flows across the respective surfaces as shown by the arrows in Figure 3. It will be noted that these air flows, however, do not oppose each other since they are separated by the wall afforded by the bank 8.

As shown in connection with Figure 1, an alternating current source 24 may be provided for the device, in which case a rectifier shown schematically at 23 is connected in the circuit to change the alternating current to the direct current that is needed for the Peltier type heat pump. Of course, if the heat pump dehumidifying apparatus as shown in Figure 1 is used in an inhabited area, some open type of screening apparatus is necessary to prevent human contact with the projecting fins of the thermojunction members. As aforementioned, a water collecting container means 25 having an outlet 26 may be disposed at the bottom of the apparatus to collect moisture dripping from the cold fins 11c.

The apparatus shown in Figure 2 is particularly well-adapted for dehumidifying air or the like for delivery to a substantially closed chamber 27. The heat pump bank is suspended in enclosure means 28 having an inlet 29 and outlet 32. It will be noted that the inlet is disposed at the top of the cold or heat absorbing side 30 of the heat pump bank, and the outlet is disposed at the top of the hot or exhaust side. Thus, the heat pump bank defines an air passageway within the enclosure means 28. Air that enters the inlet 29 is cooled by the cold or heat absorbing side of the banks 30, which tends to cause said air to move downwardly, whereas the air on the hot or exhaust side 31 of the heat pump bank is heated and tends to rise to leave through the outlet 32. The simultaneous cooling and heating action of the opposite sides of the heat pump bank causes movement of the air without the necessity of a fan. It is to be noted that the cooling and the heating of the air complement each other in the moving of the ambient air across the surfaces of the heat pump to deliver dehumidified air to chamber 27.

While electroresponsive dehumidifying apparatus constructed in accordance with the principles of the present invention are shown in a particular relationship, it is obvious that there are many modifications and changes that may be made in said dehumidifying apparatus without departing from the spirit of the invention. All of such changes are contemplated as may come within the scope of the appended claims. What is claimed as the invention is:

1. A dehumidifying device comprising a casing having means including a thermoelectric heat pump bank defining a generally U-shaped passageway having a pair of vertical extents connected at their lower ends, said casing also having an air inlet means in communication with the upper end of one of said vertical extents and air outlet means in communication with the upper end of the other of said vertical extents, and said thermoelectric heat pump bank having cooling thermojunctions on one side thereof disposed in heat transfer relation with the air in said one vertical extent and having heating thermojunctions on the other side thereof disposed in heat transfer relation with the air in said other vertical extent, said heat pump bank when energized pumping heat therethrough from said cooling thermojunctions to said heating thermojunctions, cooling of the air in said one vertical extent by said cooling portion effecting removal of moisture therefrom and convection of the cooled air downwardly within said one vertical extent, heating of the air within said other vertical extent by said heating portion effecting convection of the heated air upwardly within said other vertical extent aiding the convection effected within said one vertical extent in generating air flow through said U-shaped passageway causing inspiration of air into said inlet and discharge of said air from said outlet in a dehumidified state.

2. A dehumidifying device comprising a casing having means defining a generally U-shaped passageway having a pair of vertical extents connected at their lower ends, said casing also having air inlet means in communication with the upper end of one of said vertical extents and air outlet means in communication with the upper end of the other of said vertical extents, and a thermoelectric heat pump bank having opposite sides forming wall portions of said vertical extents respectively and having heat absorbing thermojunction means on one side thereof disposed in heat transfer relation with the air in said one vertical extent and heat emitting thermojunction means on the opposite side thereof in heat transfer relation with the air in said other vertical extent, said heat pump bank when energized being operable to pump heat from said heat absorbing thermojunction means to said heat emitting thermojunction means, cooling of the air in said one vertical extent by absorption of heat at said heat absorbing thermojunction means effecting removal of moisture from said air and convection of the cooled air downwardly within said one vertical extent, heating of the air within said other vertical extent by emission of heat at said heat emitting thermojunction means effecting convection of the heated air upwardly within said other vertical extent aiding the convection effected within said one vertical extent in generating air flow through said passageway causing inspiration of air into said inlet and discharge of said air from said outlet in a dehumidified state.

3. In a Peltier heat pump condensing apparatus having thermoelements and hot and cold thermojunctions, a heat conductive thermojunction and condensing member having a first portion in heat conducting relationship with a cold thermojunction, said member also having a condensing portion extending horizontally away from said thermojunction and formed with a downwardly and outwardly sloping lower edge terminating at a point spaced laterally from said thermoelements, whereby upon conduction of heat from said first portion by said thermoelements, heat is conducted from said condensing portion, and fluid condensing on said condensing portion will drip from the outer terminus of the lower edge of said condensing portion.

4. In a Peltier heat pump condensing apparatus having thermoelements and hot and cold thermojunctions, a first heat conductive thermojunction and condensing member having a first portion in heat conducting relationship with a cold thermojunction, a second thermojunction and condensing member similar to said first member, said second member being spaced vertically and offset longitudinally from said first member and similarly engaging another cold thermojunction, said members each having a condensing portion extending horizontally away from the associated thermojunction and formed with a lower edge sloping downwardly and outwardly to a corner spaced laterally from said thermoelements, whereby upon conduction of heat from said first portions by said thermoelements, heat is conducted from said condensing portions, and fluid condensing on said condensing portions will drip from said corners.

5. In a Peltier heat pump, a bank of first and second dissimilar thermoelements each having end portions and side portions, first and second thermojunction members interposed between and joined to the side portions of said first and second thermoelements to afford thermojunctions therebetween, and a layer of thermal insulation surroundingly disposed to the end portions of said thermoelements to prevent dissipation or absorption of heat thereat, said first thermojunction members extending outwardly through said insulation from one side only of said bank, and said second thermojunction members extending outwardly through said insulation from the opposite side only of said bank.

6. In a Peltier heat pump, a bank of alternately disposed P-type and N-type thermoelements each having four end portions and two side portions, condensation and absorption thermojunction members alternately interposed between and joined to the opposite side portions of each of said P-type and N-type thermoelements to afford thermojunctions therebetween, and a layer of thermal insulation enclosing said bank of joined thermoelements and thermojunction members to prevent dissipation and absorption of heat, said condensation thermojunction members having portions extending outwardly through said insulation from one side only of said bank, and said absorption thermojunction members having portions extending outwardly through said insulation from the opposite side only of said bank.

7. A thermoelectric heat pump comprising a plurality of first and second thermoelements, and a plurality of substantially flat thermojunction members of material having good electrical and thermal conductivity interposed between said first and second thermoelements with the latter joined to opposite sides thereof affording thermojunctions therewith, the junctions of said thermoelements and thermojunction members also electrically connecting said first and second thermoelements for current flow from a first thermoelement through the thickness of said thermojunction member to a second thermoelement then through the thickness of a second thermojunction member to another first thermoelement, said thermojunction members having heat absorbing and heat emitting portions projecting in opposite directions respectively from between said thermoelements to afford heat transfer means for said thermojunctions.

8. A Peltier heat pump condensing apparatus comprising thermoelements having hot and cold thermojunctions, a first heat conductive thermojunction and condensing member having a first portion in heat conducting relationship with a cold thermojunction and having a lower edge, said first member also having a condensing portion disposed outwardly from said thermoelement and having a lower edge sloping downwardly from the lower edge of said first portion to a corner, a second heat conductive thermojunction member having a first portion in heat conductive relationship with a hot thermojunction and having a second portion spaced outwardly therefrom for dissipation of heat, whereby upon conduction of heat from said first portion of said first thermojunction by said thermoelements, heat is conducted from said condensing portion, and fluid condensing on said condensing portion will drip from said corner, and upon conduction of heat to said second portion of said second thermojunction member from said first portion, heat will be dissipated.

9. In a Peltier heat pump condensing apparatus having thermoelements and hot and cold thermojunctions, a first heat conductive thermojunction and condensing member having a first portion in heat conducting relationship with a cold thermojunction and having a lower edge, a second thermojunction and condensing member formed identically to said first member, said second member being spaced downwardly and offset laterally from said first member and similarly having a first portion engaging another cold thermojunction, insulation means intermediate said first portion of said first and second thermojunction members, both of said members also having a condensing portion sloping downwardly from the lower edge of their respective said first portions and leading to a corner, whereby upon conduction of heat from said first portion by said thermoelements, heat is conducted from said condensing portions, and fluid condensing on said condensing portion will drip from the respective corners.

10. A Peltier heat pump comprising a bank of thermoelements having at least one row of first and second dissimilar thermoelements alternately arranged, a first thermojunction member having a substantially flat portion interposed between a pair of adjacent first and second thermoelements with the adjacent ends of said thermoelements electrically joined to opposite sides thereof for current flow from one through the thickness of said thermojunction member portion to the other, said thermojunction member having a portion projecting laterally from one side only of said bank to afford heat transfer means, and a second thermojunction member having a substantially flat portion interposed between the opposite end of said second thermoelement and the adjacent end of the next thermoelement in said row with the adjacent ends of said second and said last-mentioned thermoelement electrically joined to opposite sides thereof for current flow from one through the thickness of said second thermojunction member portion to the other, said second thermojunction member having a portion projecting laterally from the opposite side only of said bank to afford heat transfer means of a sense opposite that afforded by the laterally projecting portion of said first thermojunction member.

11. A Peltier heat pump comprising a bank of thermoelements having at least one row of first and second dissimilar thermoelements alternately arranged, a layer of thermal insulation surrounding said bank, a first thermojunction member having a substantially flat portion interposed between a pair of adjacent first and second thermoelements with the adjacent ends of said thermoelements electrically joined to opposite sides thereof for current flow from one through the thickness of said thermojunction member portion to the other, said thermojunction member having a portion projecting laterally from one side only of said bank through said insulation to afford heat transfer means, and a second thermojunction member having a substantially flat portion interposed between the opposite end of said second thermoelement and the adjacent end of the next thermoelement in said row with the adjacent ends of said second and said last-mentioned thermoelement electrically joined to opposite sides thereof for current flow from one through the thickness of said second thermojunction member portion to the other, said second thermojunction member having a portion projecting laterally from the opposite side only of said bank through said insulation to afford heat transfer means of a sense opposite that afforded by the laterally projecting portion of said first thermojunction member.

References Cited in the file of this patent

UNITED STATES PATENTS

| | | |
|---|---|---|
| 420,641 | Dewey | Feb. 4, 1890 |
| 1,119,011 | Grosvenor | Dec. 1, 1914 |
| 1,120,781 | Altenkirch et al. | Dec. 15, 1914 |
| 1,818,437 | Stuart | Aug. 11, 1931 |
| 2,283,391 | Siefken | May 19, 1942 |
| 2,352,056 | Wilson | June 20, 1944 |
| 2,478,617 | Anderegg | Aug. 9, 1949 |
| 2,685,608 | Justi | Aug. 3, 1954 |
| 2,729,949 | Lindenblad | Jan. 10, 1956 |
| 2,777,975 | Aigran | Jan. 15, 1957 |
| 2,779,172 | Lindenblad | Jan. 29, 1957 |

FOREIGN PATENTS

| | | |
|---|---|---|
| 646 | Great Britain | Jan. 12, 1905 |